US011016170B2

(12) United States Patent
Larsen et al.

(10) Patent No.: US 11,016,170 B2
(45) Date of Patent: May 25, 2021

(54) FIXED LOW INTERMEDIATE FREQUENCY APPROACH TO DISTANCE MEASUREMENT TRANSMITTER

(71) Applicant: Honeywell International Inc., Morris Plains, NJ (US)

(72) Inventors: David Larsen, Snohomish, WA (US); Thomas D. Moran, Bellevue, WA (US); Mark C. Virtue, Kirkland, WA (US)

(73) Assignee: Honeywell International Inc., Charlotte, NC (US)

( * ) Notice: Subject to any disclaimer, the term of this patent is extended or adjusted under 35 U.S.C. 154(b) by 309 days.

(21) Appl. No.: 16/247,212

(22) Filed: Jan. 14, 2019

(65) Prior Publication Data

US 2020/0225316 A1 Jul. 16, 2020

(51) Int. Cl.

| | |
|---|---|
| ***G01S 7/282*** | (2006.01) |
| ***G01S 13/933*** | (2020.01) |
| ***G01S 13/78*** | (2006.01) |
| ***H04B 1/04*** | (2006.01) |
| ***H04B 1/40*** | (2015.01) |
| *G01S 13/00* | (2006.01) |

(52) U.S. Cl.

CPC ............ *G01S 7/282* (2013.01); *G01S 13/785* (2013.01); *G01S 13/933* (2020.01)

(58) Field of Classification Search

CPC ...... G01S 7/282; G01S 13/933; G01S 13/785; H04B 1/0475; H04B 1/40; H04B 1/0075; H04B 40/90; H04B 1/0078

See application file for complete search history.

(56) References Cited

U.S. PATENT DOCUMENTS

| | | | |
|---|---|---|---|
| 7,161,528 | B2 | 1/2007 | Kirby et al. |
| 7,525,474 | B2 | 4/2009 | Carocari et al. |

(Continued)

FOREIGN PATENT DOCUMENTS

| | | | |
|---|---|---|---|
| EP | 0847628 | A2 | 6/1998 |
| KR | 20160060881 | A | 5/2016 |

OTHER PUBLICATIONS

Extended Search Report from counterpart European Application No. 20151315.7, dated Apr. 1, 2020, 7 pp.

(Continued)

*Primary Examiner* — Bernarr E Gregory

(74) *Attorney, Agent, or Firm* — Shumaker & Sieffert, P.A.

(57) ABSTRACT

A device and techniques for generating and filtering a signal for transmission, such as the signal used to interrogate distance measuring equipment (DME), which may be tuned to a channel or frequency selected from a wide bandwidth. A system according to the techniques of this disclosure may generate a narrow band intermediate frequency (IF) signal with desired pulse characteristics, mix the IF signal with a local oscillator (LO) to upconvert to the desired radio frequency (RF) signal, then filter the upconverted RF signal through one of several narrow band filters in a filter bank to remove any undesired signal images. The system may select the filter from the filter bank depending on the transmitted RF frequency. In this manner the system of this disclosure may generate signals to span a wide RF bandwidth by using a narrow bandwidth IF signal generator.

20 Claims, 4 Drawing Sheets

(56) References Cited

U.S. PATENT DOCUMENTS

| | | | | |
|---|---|---|---|---|
| 7,542,519 | B2 * | 6/2009 | McCallister | H04B 1/0075<br>330/149 |
| 9,246,520 | B2 * | 1/2016 | Lee | H04B 1/0078 |
| 2003/0236068 | A1 * | 12/2003 | Jespersen | H04H 40/90<br>455/11.1 |
| 2016/0013923 | A1 | 1/2016 | Malaga et al. | |

OTHER PUBLICATIONS

Response to Extended Search Report dated Apr. 1, 2020, from counterpart European Application No. 20151315.7, filed May 6, 2020, 18 pp.

Notice of Intent to Grant and Text Intended to Grant from counterpart European Application No. 20151315.7, dated Feb. 26, 2021, 31 pp.

* cited by examiner

FIXED LOW INTERMEDIATE FREQUENCY APPROACH TO DISTANCE MEASUREMENT TRANSMITTER

TECHNICAL FIELD

The disclosure relates to avionic transmitters.

BACKGROUND

A transmitter capable of interrogating distance measurement equipment (DME) stations used for aviation navigation must span the frequency range of 1025 MHz through 1150 MHz. As with other radio frequency (RF) transmitters, a DME transmitter may include the functions of signal generation, modulation, filtering, and amplification. One approach to RF transmission is to generate an intermediate frequency (IF) with the correct amplitude and pulse shape by using a digital to analog converter (DAC). After the IF signal with the desired pulse characteristics has been created, the IF signal is upconverted to the desired transmission frequency by mixing the IF signal with a signal generated by a local oscillator (LO) to form an RF signal. The RF signal contains undesired signal products that need to be removed by a filter that rejects the undesired image signals and passes the desired signal to be transmitted.

A DME transmitter may use an IF generator of at least 125 MHz (i.e. 1150 MHz−1025 MHz=125 MHz) so that the LO frequency does not fall within the DME interrogation frequency range. To generate an IF with a frequency range of 125 MHz using a digital to analog converter (DAC) requires a clock frequency of at least 250 MHz to prevent aliasing.

SUMMARY

In general, the disclosure is directed to techniques for generating and filtering a signal for transmission, such as the signal used to interrogate distance measuring equipment (DME) which may be tuned to a frequency selected from across a wide bandwidth. A system according to the techniques of this disclosure may generate a narrow band intermediate frequency (IF) signal with desired pulse characteristics, mix the IF signal with a local oscillator (LO) to upconvert to the desired radio frequency (RF) signal, and then filter the upconverted RF signal through one of several narrow band filters in a filter bank to remove any undesired signal images. The system may select the filter from the filter bank depending on the transmitted RF frequency. In this manner the system of this disclosure may generate signals to span a wide RF bandwidth by using a narrow bandwidth IF signal generator.

In one example, the disclosure is directed to a radio frequency transmitter device that includes a control unit; a signal generation unit configured to generate an intermediate frequency (IF) signal based on a first signal from the control unit; a local oscillator (LO) configured to generate a radio-frequency (RF) LO signal based on a second signal from the control unit; a filter bank comprising a plurality of band-pass filters (BPF), wherein each BPF of the filter bank is configured to pass a fraction of a total bandwidth of the device; a mixer configured to mix the IF signal with the LO signal to produce a RF carrier signal. The control unit is configured to select a BPF from the plurality of BPFs based on the generated IF signal and the generated LO signal, and the BPF of the filter bank is configured to filter the RF carrier signal.

In another example, the disclosure is directed to a system that includes a control unit; a local oscillator (LO) configured to generate a radio-frequency (RF) LO signal based on a control signal from the control unit. The system may include a first channel, the first channel comprising: a first signal generation unit configured to generate a first intermediate frequency (IF) signal based on a first instruction from the control unit; a first mixer configured to: receive a first LO signal from the LO and the first IF signal from the first signal generation unit, and output a first carrier signal comprising the mixed first LO signal and first IF signal a first bandpass filter (BPF) configured to receive the first carrier signal, and output a filtered first carrier signal, wherein the filtered first carrier signal comprises a transponder reply signal. The system may also include a second channel, that includes: a second signal generation unit configured to generate a second IF signal based on a second signal from the control unit; a filter bank comprising a plurality of BPFs, wherein each BPF of the filter bank is configured to pass a fraction of a total bandwidth of the second channel; a mixer configured to mix the second IF signal with the LO signal to produce a RF carrier signal. The control unit is configured to select a BPF from the plurality of BPFs based on the generated IF signal and the generated LO signal, and the BPF of the filter bank is configured to filter the RF carrier signal.

In another example, the disclosure is directed to a method that includes generating, an intermediate frequency (IF) signal; modulating the IF signal to produce desired pulse characteristics; mixing the IF signal with a selected local oscillator (LO) signal to produce a carrier signal; selecting a bandpass filter (BPF) from a filter bank comprising a plurality of BPFs based on the IF signal and the selected LO signal, wherein each BPF of the filter bank is configured to pass a fraction of a total bandwidth of the transmitter circuit; and filtering the carrier signal with the selected BPF to produce a filtered carrier signal.

The details of one or more examples of the disclosure are set forth in the accompanying drawings and the description below. Other features, objects, and advantages of the disclosure will be apparent from the description and drawings, and from the claims.

DETAILED DESCRIPTION

A system of this disclosure may generate and filter a signal for transmission, such as the signal used to interrogate distance measuring equipment (DME), which may span a frequency selected from a wide band of frequencies. A system according to the techniques of this disclosure may generate a narrow band intermediate frequency (IF) signal with desired pulse characteristics and mix the IF signal with a selectable frequency local oscillator (LO) to upconvert the IF to the desired radio frequency (RF) signal. The system may then filter the upconverted RF signal through one of several narrow band filters in a filter bank to remove any undesired signal images. The system may select the filter from the filter bank depending on the transmitted RF frequency. In this manner the system of this disclosure may generate signals to span a wide RF bandwidth by using a narrow bandwidth signal generator.

In some examples the signal generator is a digital to analog converter (DAC) which generates the required modulation such as pulse shaping at frequencies below RF and before the signal is amplified to transmission power. Performing pulse shaping and frequency selection at lower frequencies may reduce cost and complexity for the system of this disclosure when compared to systems that need to use an IF of at least 125 MHz. The system of this disclosure may use a DAC that operates across a narrow bandwidth that is some fraction of the total bandwidth across which the system operates. Using a narrower bandwidth DAC may enable the use of a lower frequency clock input, which may result in reduced system power and a lower cost DAC component when compared with using a wider bandwidth DAC capable of spanning the entire system bandwidth.

The system may mix the output of the DAC with the output of the LO. The LO may be set to output one of several RF frequencies, which when mixed with the DAC output, results in an RF carrier signal for transmission that is tuned to transmit at any frequency across the entire system bandwidth. Along with the desired RF carrier signal, the output of the mixer includes some undesired signal images. The system may select from one of several filters of a filter bank. The selected filter may pass the desired carrier signal while attenuating the undesired signal images. The system may further amplify, then transmit the desired carrier signal via an antenna.

Figure 1:
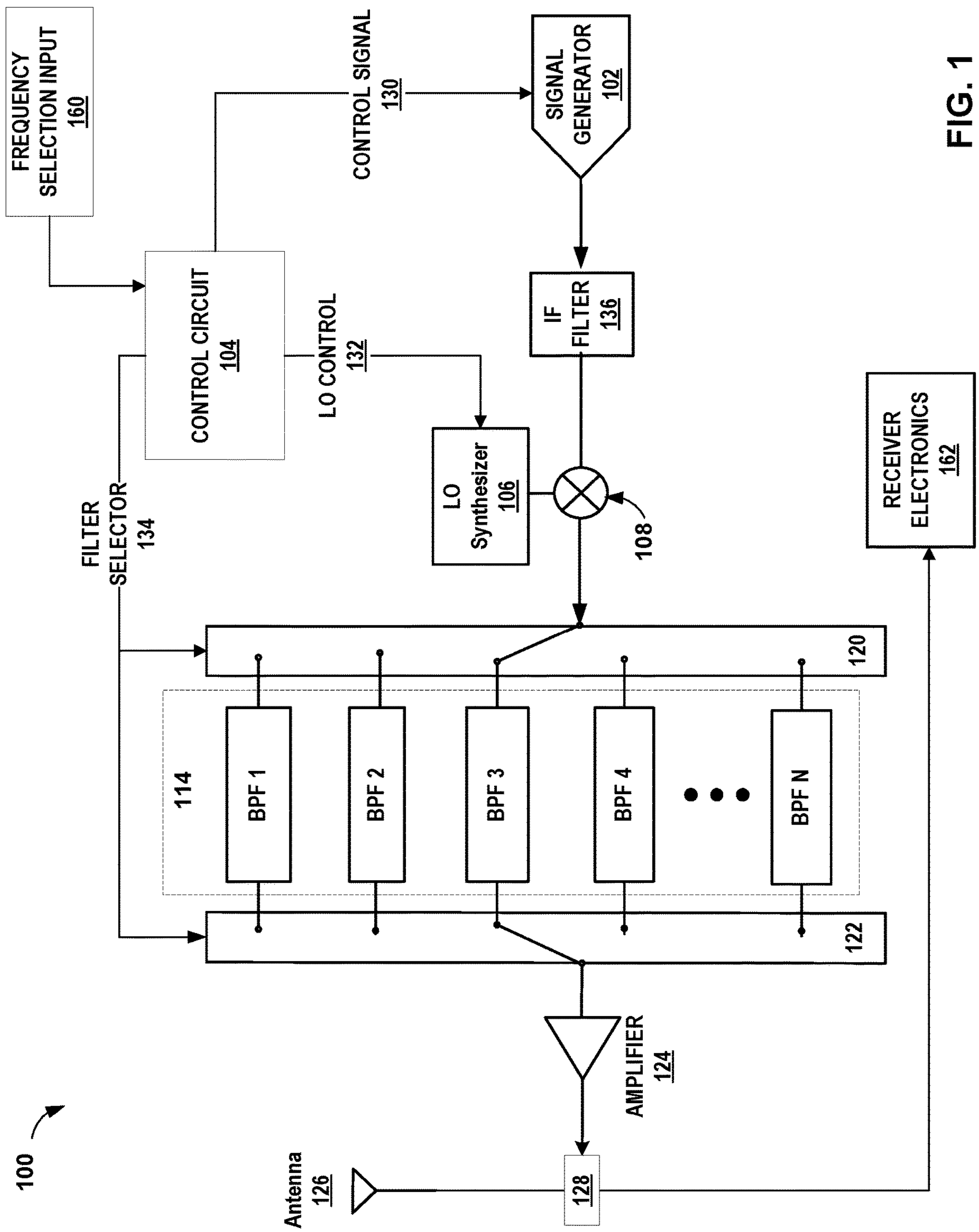
FIG. 1 is a block diagram illustrating a RF transmitter device according to one or more techniques of this disclosure.

FIG. 1 is a block diagram illustrating a RF transmitter device according to one or more techniques of this disclosure. RF transmitter device 100 may, for example, be a component of a multi-mode radio system that may operate with a traffic collision avoidance system (TCAS), DME, and other systems. The multi-mode radio may operate to both send TCAS interrogation signals and respond with a transponder reply signal when interrogated by a TCAS or ground station radar signal.

Device 100 includes a filter bank 114 which includes BPF 1 through BPF N, with each BPF of the filter bank 114 configured to pass a fraction of a total bandwidth of the device. Device 100 also includes signal generator 102 that outputs an IF signal to mixer 108 through IF filter 136. Mixer 108 also receives an RF signal from LO synthesizer 106 and outputs the upconverted RF carrier signal to selector switch 120, which is further electrically connected to one of BPF 1-BPF N in filter bank 114 of device 100. The output from the selected BPF of filter bank 114 goes to selector switch 122 and further output to amplifier 124. Receiver/transmitter (RX/TX) switch 128 transmits, via antenna 126, the amplified and filtered RF carrier signal. Device 100 further includes control circuit 104, which may receive a frequency selection input 160 and output control signals to signal generator 102, LO synthesizer 106 and selector switches 120 and 122 based on the selected output frequency. In other examples, device 100 may include more or fewer components than those shown in the example of FIG. 1.

Signal generator 102 may generate a signal with the desired amplitude and pulse shape and other characteristics at an IF that, in some examples, may be in the low hundreds of megahertz (MHz), e.g. less than 150 MHz. Some of the of the other characteristics of the signal may include time between pulses, groupings of pulses, and similar characteristics. Signal generator 102 may generate a signal at the selected IF, then modulate the IF signal to produce desired pulse characteristics of the IF signal. Signal generator 102 may also be referred to as signal generation unit 102 in this disclosure. In some examples signal generator 102 may be implemented with a DAC. In other examples, signal generator 102 may be implemented with a circuit that includes a voltage controlled oscillator (VCO) and other circuit elements. Performing the desired signal shaping and other signal processing at frequencies less than 150 MHz may have an advantage over the same signal shaping done at higher frequencies because signal shaping at the lower frequencies may be implemented at lower power and with less costly components, e.g. reduced electromagnetic interference (EMI) shielding requirements. The techniques of this disclosure may also simplify the computational requirements for the signal processing needed to control the DAC.

IF filter 136 receives the IF frequency from signal generator 102 and filters any aliasing or other signal images that may have been produced by signal generator 102. IF filter 136 may be a BPF that is configured to allow the IF signal to continue to mixer 108.

LO synthesizer 106, outputs the desired frequency such that when mixed with the signal from signal generator 102, the result is an RF carrier signal at the desired frequency with the desired pulse shape and other characteristics. In other words, in the example of FIG. 1, signal generator 102 contributes the desired signal characteristics and LO synthesizer 106 contributes the LO signal at the RF frequency to result in the desired RF carrier signal when upconverted at mixer 108. In other examples, changing the frequency of the RF signal can be accomplished by tuning either the IF from signal generator 102, changing the frequency of the LO signal from LO synthesizer 106, or some combination of both.

Mixer 108 multiplies the IF output from signal generator 102 with the LO frequency from LO synthesizer 106. Mixer 108 may output upconverted signals that include signals with frequencies $f_{LO} \pm f_{IF}$, along with other signal images to selector switch 120.

Selector switches may receive filter selector signal 134 from control circuit 104 to select the appropriate BPF from filter bank 114. The selected BPF is based on the generated IF signal and the generated LO signal to filter out the undesired signal images and pass desired RF carrier signal to amplifier 124. In other words, selector switch 122 is configured to electrically connect the desired BPF of filter bank 114 to amplifier 124. The pass band of a BPF may be selected to be slightly wider than the desired frequency range to be passed. Each BPF of filter bank 114 may be configured to pass a fraction of a total bandwidth for device 100. In some examples one or more of BPF 1-BPF N may be implemented as a surface acoustic wave (SAW) filter.

Amplifier 124 may increase the signal power of the RF carrier signal to be transmitted. RX/TX switch 128 may receive the amplified RF carrier signal from amplifier 124 and pass the signal to antenna 126 to be transmitted. RX/TX switch 128 may also conduct signals received from antenna 126 to receiver electronics 162. RX/TX switch 128 may include circuitry to protect receiver electronics 162 from the amplified RF carrier signal from amplifier 124. In some examples RX/TX switch 128 may be implemented as a switch or group of switches. In other examples, RX/TX switch 128 may be implemented as a circulator or similar RF component.

In operation, control circuit 104 may receive a frequency selection input 160, which determines the desired RF carrier signal to be output from antenna 126. Control circuit 104 may output control signal 130 to signal generator 102. Control signal 130 may cause signal generator 102 to generate the desired IF and modulate the generated IF to output the desired pulse characteristics, e.g. pulse shape, number of pulses, groupings of pulses, and similar characteristics. Control circuit 104 may also output LO control 132 to cause LO synthesizer to generate a RF LO signal based on a LO control 132 from control circuit 104. Control circuit 104 may also be referred to as control unit 104 in this disclosure and may be implemented as any type of programmable circuitry, fixed function circuitry, or combination thereof.

The multiplication at mixer 108 may result in other signal images that may be removed by the selected BPF, e.g. one of BPF 1-BPF N. For example, a 30 MHz signal generated by signal generator 102 may be multiplied by 1 GHz LO signal from LO synthesizer 106. The output of mixer 108 may include a 1 GHz+30 MHz=1.03 GHz, a 1 GHz−30 MHz=970 MHz along with other signal images, such as some leakage of the LO signal at 1 GHz as well as harmonics of the mixed signal. In the example in which the desired RF transmit frequency is 1.03 GHz, then control circuit 104 may send filter selector signal 134 to selector switches 120 and 122 to select an appropriate BPF to remove all signal images except the desired 1.03 GHz signal. Amplifier 124 may then amplify the desired RF carrier signal for transmission by antenna 126, as described above.

Device 100 may have advantages over other examples of RF transmitter devices that generate a single IF frequency at frequencies greater than e.g. 125 MHz. Pulse shaping at higher frequencies may require more costly components, higher clock frequencies and more complex pulse shaping techniques. The linear lineup of device 100 may simplify circuit design, allow the use of a low-cost and low-power DAC, and may also provide more consistent performance. The selectable BPF filter bank 114 of device 100, rather than a single, wide-bandwidth BPF, allows the generation of a narrow bandwidth IF. Generating a narrower bandwidth IF may avoid the requirement for a more costly DAC that must span the entire bandwidth of device 100.

Figure 2:
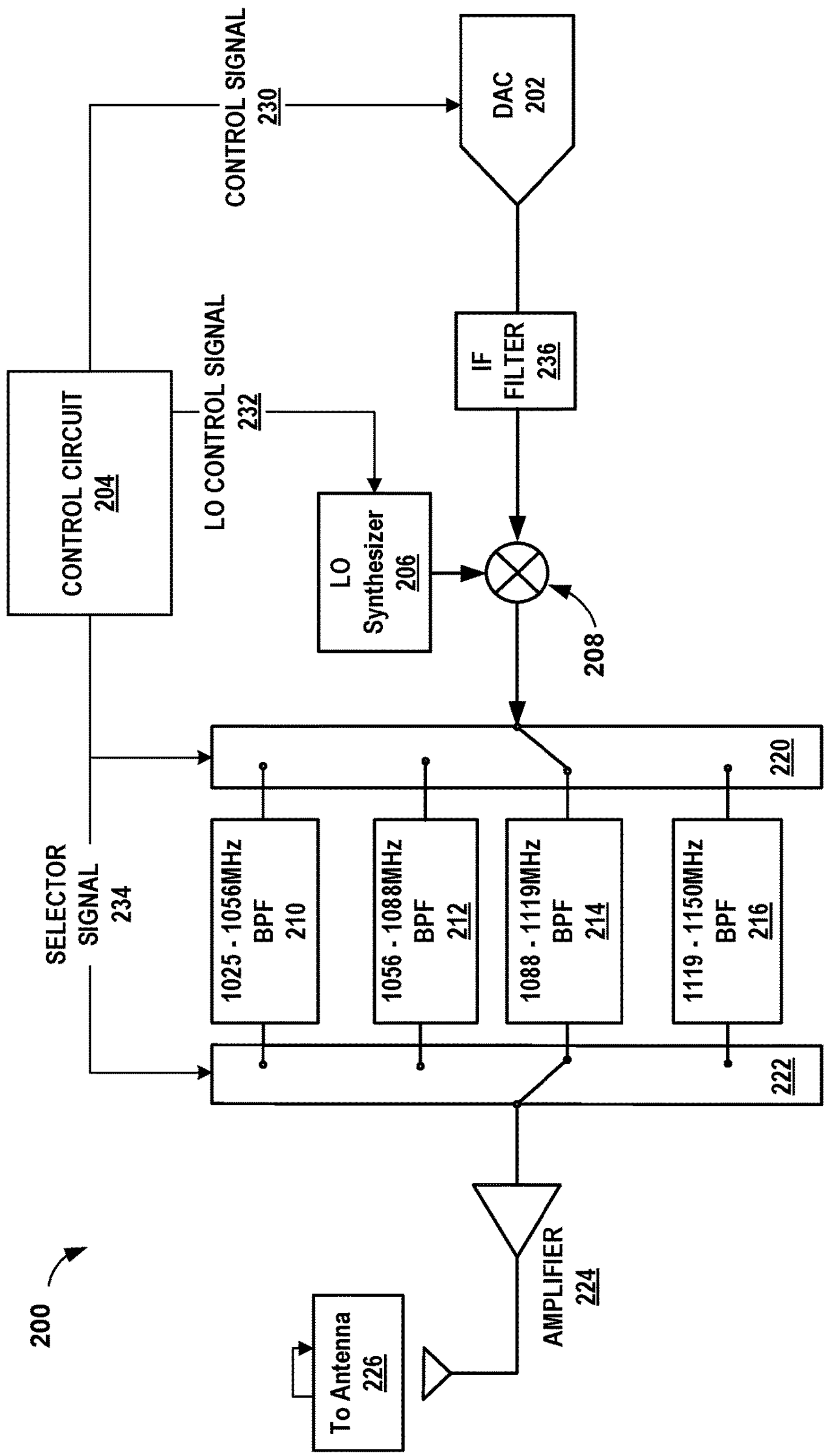
FIG. 2 is a block diagram illustrating an example implementation of a RF transmitter device for sending distance measuring equipment (DME) interrogation signals according to one or more techniques of this disclosure.

FIG. 2 is a block diagram illustrating an example implementation of a RF transmitter device for sending distance measuring equipment (DME) interrogation signals according to one or more techniques of this disclosure. RF transmitter device 200 is an example of RF transmitter device 100 described above in relation to FIG. 1.

Device 200 includes DAC 202 that outputs an IF signal to mixer 208 through IF filter 236. Mixer 208 also receives an RF signal from LO synthesizer 206 and outputs the upconverted RF carrier signal to selector switch 220, which is further connected to one of BPF 210-BPF 216 in the filter bank of device 200. The output from the selected BPF of the filter bank goes to selector switch 222 and further output to amplifier 224. The amplified and filtered RF carrier signal be transmitted by antenna 126. In some examples, device 200 may also include an RX/TX switch, similar to RX/TX switch 128 and receiver electronics similar to receiver electronics 162, described above in relation to FIG. 1 (not shown in FIG. 2).

In the example of FIG. 2, device 200 further includes control circuit 204, which may receive a frequency selection input (not shown in FIG. 2) and output control signals to DAC 202, LO synthesizer 206 and selector switches 220 and 222 based on the selected output frequency. In other examples, device 200 may include more or fewer components than those shown in the example of FIG. 1.

In response to receiving control signal 230 from control circuit 204, DAC 202 may generate an IF signal and modulate the IF signal to have the desired signal characteristics, e.g. pulse shape, which may include a pulse rise time and fall time. In the example of device 200, similar to the example of device 100 described above in relation to FIG. 1, DAC 202 generates the modulated signal at a single intermediate frequency. In response to LO control signal 232 from control circuit 204, LO synthesizer 206 generates an LO signal such that the RF carrier signal, i.e. the DME interrogation signal, is transmitted at the desired frequency. In other words, for the example of device 200, DAC 202 outputs the desired pulse characteristics and changing the frequency of LO synthesizer 206 determines the frequency of the RF carrier signal.

The DME interrogation band covers 1025-1150 MHz. In some examples, the total bandwidth of the RF filter bank for a DME RF transmitter device may be slightly wider than the frequency range of the DME transmitter (i.e. 1150 MHz−1025 MHz=125 MHz). For device 200, which uses four BPFs 210-216 in the filter bank, DAC 202 need only output an IF that spans approximately one fourth of the frequency range of 125 MHz (i.e. approximately 32 MHz). As described above in relation to FIG. 1, using an IF frequency of less than 125 MHz may be desirable because a DAC that generates a lower IF may reduce the cost and power consumption of DAC 202. A frequency range of 32 MHz also allows a clock frequency for DAC 202 to be approximately 64 MHz In the example of FIG. 2, BPF 210 has a passband from 1025-1056 MHz, BPF 212 has a passband from 1056-1088 MHz, BPF 210 has a passband from 1088-1119 MHz, BPF 210 has a passband from 1119-1150 MHz.

In one example of using device 200, a vehicle operator, such as the pilot of an aircraft or other system user, may select a DME station on the ground that the vehicle operator wishes to interrogate. Interrogating a DME ground station may provide the vehicle operator with the distance between the vehicle and the ground station. In the example of an aircraft, the distance to the ground station may be considered a slant range. In other examples, a flight management system (FMS) may automatically select a DME station to cross-check a navigational fix received from a different navigation system, such as a global positioning system (GPS) navigational fix. Once the vehicle operator selects the DME ground station, then control circuit 204 may receive a frequency selection input, such as frequency selection input 160 described above in relation to FIG. 1.

Control circuit 204 may send a control signal 230 to DAC 202 to generate a pulse pair with the desired pulse shape and a desired pulse spacing between pulses at an IF of 32 MHz. Control circuit 204 may send LO control signal 232 to LO synthesizer 206 to generate an LO signal to output a DME interrogation signal at a transmitted RF carrier signal set to an interrogation channel for the selected DME ground station, e.g. 1165 MHz. As one example, LO synthesizer 206 may output an LO signal of 1097 MHz to mixer 208.

Mixer 208 may receive both the LO signal from LO synthesizer 206 and the modulated IF signal pulse pair, after the IF signal has been filtered by IF filter 236 to remove any undesired aliasing or other signal images. The unfiltered RF carrier signal output of mixer 208 may include frequencies $f_{LO} \pm f_{IF}$, i.e. 1097 MHz+32 MHz=1129 MHz and 1097

MHz−32 MHz.=1065 MHz. The unfiltered RF carrier signal output from mixer 208 may also include other undesired signal images.

Control circuit 204 may set selector switches 220 and 222 to select BPF 212, with a passband of 1056-1088 MHz based on the generated IF signal and the LO signal. BPF 212 includes the desired interrogation channel of 1065 MHz. BPF 212 may filter the 1129 MHz signal image, as well as one or more of any other signal images in the RF carrier signal and output the resulting filtered RF carrier signal to amplifier 224. Amplifier 224 may further send the amplified RF carrier signal to antenna 226 to be transmitted to the selected DME ground station.

In this manner, device 200 may output a DME interrogation signal at the desired RF carrier signal frequency with the desired pulse characteristics generated by DAC 202. Device 200 may output the DME interrogation at any selected channel across the DME frequency range of 1025-1150 MHz, but DAC 202 may only need to generate an IF that is a fraction of the total DME bandwidth of 125 MHz.

Figure 3:
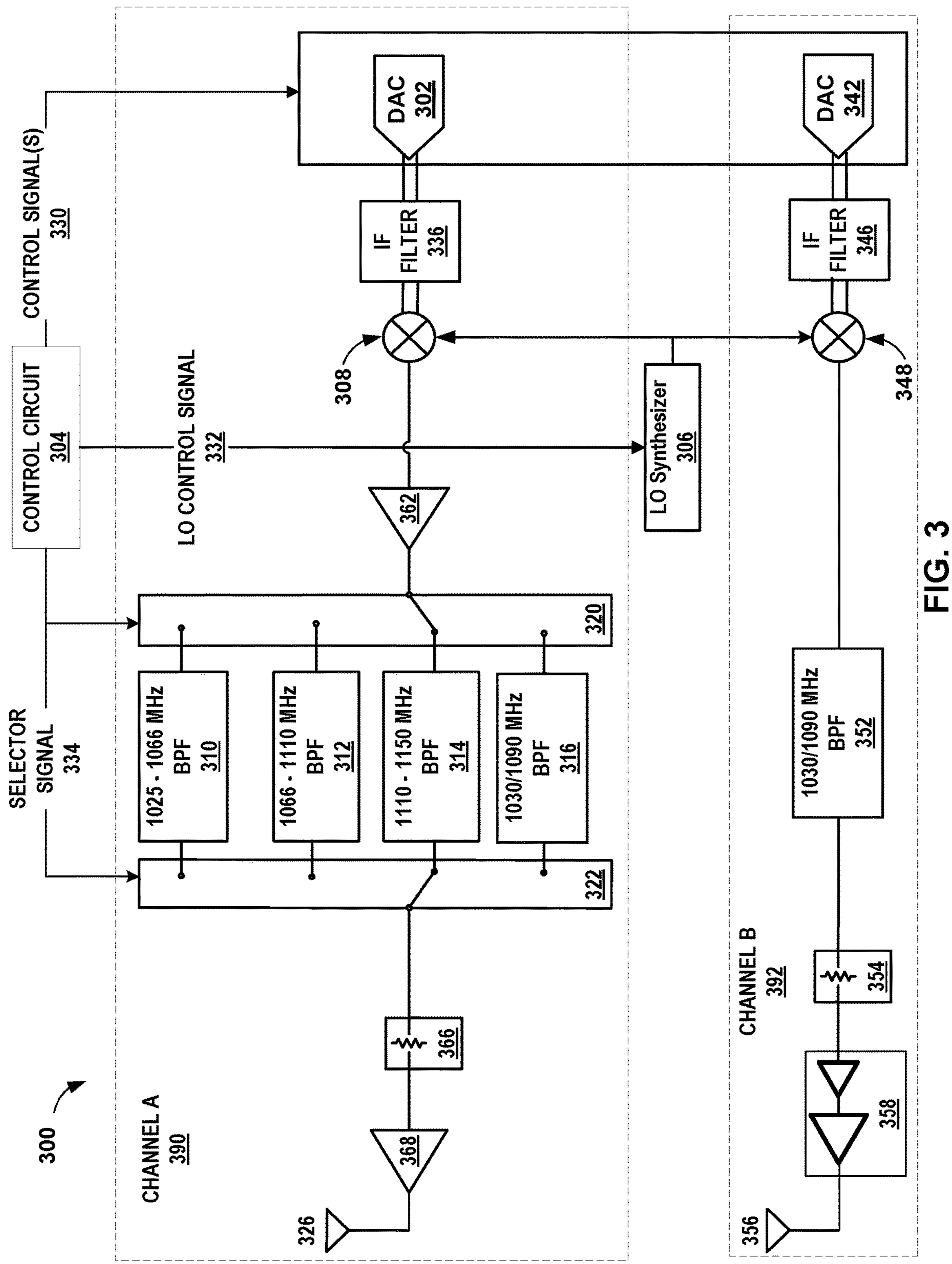
FIG. 3 is a block diagram illustrating an example multi-channel system including a filter bank according to one or more techniques of this disclosure.

FIG. 3 is a block diagram illustrating an example multi-channel system including a filter bank according to one or more techniques of this disclosure. System 300 includes other examples similar to devices 100 and 200 described above in relation to FIGS. 1 and 2. The example of system 300 in FIG. 3 depicts a two channel transmitter system. Other examples of system 300 may include more channels and more or fewer components not shown in FIG. 3 including pre-amplifiers, additional filtering and signal processing components.

System 300 depicts a multi-channel radio configured to interrogate DME as well as interrogate and respond to TCAS signals. In some examples, TCAS transmits interrogations at 1030 MHz and an ATC transponder sends replies to received interrogations at 1090 MHz. As described above in relation to FIG. 2 above, DME interrogations are selectable between 1025 and 1150 MHz, depending on the desired DME station. System 300 includes control circuitry 304, local oscillator synthesizer 306, channel A 390 and channel B 392.

Channel A 390 is another example of RF transmitter device 100 depicted in FIG. 1. Channel A 390 includes a filter bank with several BPFs, with each BPF of the filter bank configured to pass a fraction of a total bandwidth of the device. Channel A 390 is configured to operate as a DME interrogation device with the DME bandwidth divided into three BPFs. Channel A 390 includes a fourth BPF configured to filter either TCAS interrogation or transponder reply RF carrier signals.

Channel A 390 also includes DAC 302, IF Filter 336, mixer 308, pre-amplifier 362, selector switches 320 and 322, BPF 310-316, temperature compensation circuit 366, amplifier 368 and antenna 326. Mixer 308, IF Filter 336, selector switches 320 and 322, amplifier 368 and antenna 326 all perform the same functions and have the same characteristics as mixer 208, IF Filter 236, selector switches 220 and 222, amplifier 224 and antenna 226, described above in relation to FIG. 2.

DAC 302 performs the same IF generation and modulation functions described above for DAC 202 and signal generator 102 depicted in FIGS. 2 and 1 respectively. DAC 302 may receive control signals 330 from control circuitry 304. In addition to generating the desired pulse characteristics for DME interrogation signals, DAC 302 may also generate pulses with the desired characteristics for TCAS interrogations and transponder reply signals.

Because the filter bank of channel A 390 includes three BPFs, DAC 302 may generate an IF of approximately one-third the total DME interrogation frequency range of 125 MHz. In this manner system 300 provides similar advantages of a reduced cost and lower power DAC than that required to generate 125 MHz for systems that may include only a single BPF for the entire DME interrogation signal frequency range. For example, DAC 302 may generate an IF signal of approximately 85 MHz and modulate the generated IF signal as appropriate to produce desired pulse characteristics in response to control signal 330. An IF signal of 85 MHz may require an input clock set to approximately double the desired IF frequency to avoid aliasing. Therefore, a clock frequency input to DAC 302 of approximately 200 MHz may be sufficient to generate an IF signal for channel A 390. In contrast, an RF transmitter with a single BPF for the DME frequency range of 125 MHz may require an input clock of at least 250 MHz. In addition, the configuration of channel A 390 allows flexibility for the same transmitter lineup to provide both TCAS and DME functions.

Pre-amplifier 362 may amplify the RF carrier signal output of mixer 308 before conducting the RF carrier signal to the filter bank to be filtered by the selected BPF. Pre-amplifier 362 may increase the RF carrier signal to avoid distortion and interference from other circuit components, such as power supplies (not shown in FIG. 3). Control circuit 304 may output selector signal 334 to select a BPF from the filter bank depending on the mode (TCAS or DME) of channel A 390 and the selected DME channel.

Channel A 390 may include one or more temperature compensation circuits 366. Temperature compensation circuit 366 may adjust the line attenuation, or other characteristics of channel A 390, to compensate for changes in temperature. In the example of FIG. 3, temperature compensation circuit 366 is between selector switch 322 and amplifier 368. In other examples temperature compensation circuit 366 may be placed in other locations within channel A 390.

LO synthesizer 306 performs the similar functions as described above for LO synthesizer 106 and 206 depicted in FIGS. 1 and 2 respectively. In response to LO control signal 332 from control circuit 304, LO synthesizer 306 may generate an LO signal to upconvert the IF frequency to produce the desired RF carrier signal. In the example of FIG. 3, system 300 includes a single LO synthesizer 306. In other examples system 300 may include additional LO synthesizers. However, a single LO synthesizer may provide advantages including reduced cost, reduced power consumption, and smaller size when compared to other examples.

Channel B 392 is configured to transmit TCAS interrogation and transponder reply signals. Channel B 392 includes DAC 342, IF filter 346, mixer 348, BPF 352, temperature compensation circuit 354, amplifier 358 and antenna 356. Similar to BPF 316, BPF 352 may filter the undesired signal images in the RF carrier signal output from mixer 348. In some examples, BPF 352 may include two BPFs configured to pass RF carrier signals at either 1030 MHz or 1090 MHz. In the example of FIG. 3, channel B 392 does not include a selector switch.

Amplifier 358 may include one or more pre-amplifiers and one or more other amplifier stages. As with amplifier 368, amplifier 358 amplifies the RF carrier signal to be transmitted by antenna 356. DAC 342, IF filter 346, mixer 348, temperature compensation circuit 354, and antenna 356 perform the same functions and have the same characteristics as described above for signal generator 102, IF filter 136, mixer 108, and antenna 126 depicted in FIG. 1 and temperature compensation circuit 366 described above.

A multi-mode RF transmitter system, such as system 300, may include a filter bank, such as the filter bank in channel A 390, for channels that include functions that use a wide bandwidth, such as DME. Other examples of system 300 may include additional channels with either narrow band or wide band functions. Multi-mode RF transmitter system 300 provides several advantages including generating different modulation schemes to support multiple functions, e.g. TCAS and DME, all on the same transmitter lineup. In other words, generating the IF with a DAC at lower frequencies and lower power allows pulse shaping of the IF signal by the digital signal processing (DSP) using a less expensive DAC.

Additionally, system 300 may provide multiple functions in a single unit that may have required, for example, three separate units, e.g. DME, transponder and TCAS. System 300 may also use fewer antennae than separate units. When compared to other example RF transmitter systems, system 300 may also provide advantages including reduced cost, reduced power consumption and smaller size, which may have advantages in applications such as smaller aircraft, including unmanned aerial systems (UAS).

Figure 4:
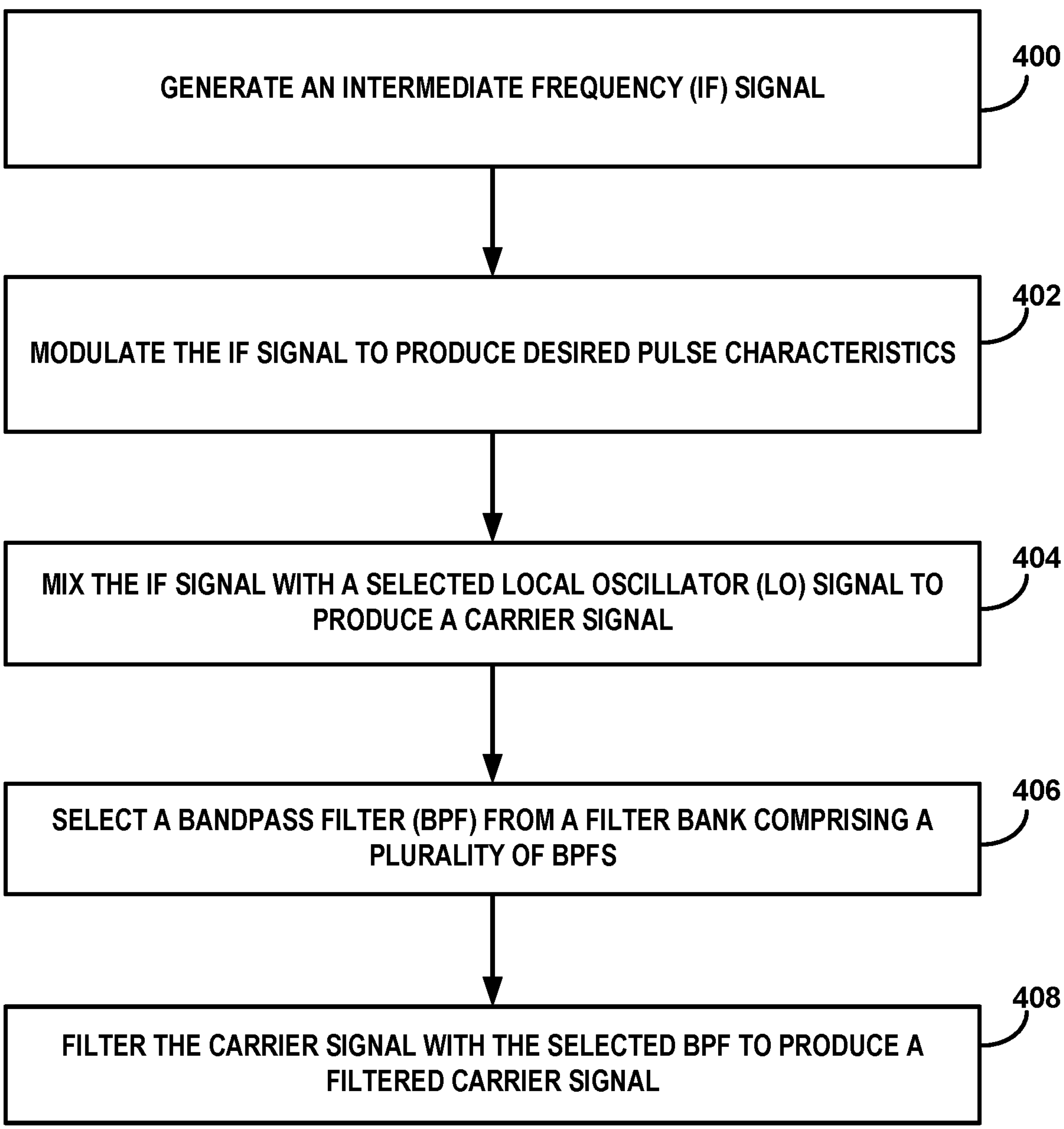
FIG. 4 is a flowchart illustrating an example operation of an RF transmitter of this disclosure.

FIG. 4 is a flowchart illustrating an example operation of an RF transmitter of this disclosure. The blocks of FIG. 4 will be described in terms of FIG. 2, unless otherwise noted.

RF transmitter device 200 may generate an IF signal with DAC 202 (400). The IF signal may be a fraction of the total frequency range of device 200 and may be slightly wider than the pass band of BPFs 210-216 in the filter bank of device 200.

DAC 202 may modulate the IF signal to produce desired pulse characteristics (402). As described above in relation to FIG. 1, pulse characteristics may include pulse width, number of pulses, rise time, fall time, and other characteristics.

Device 200 may mix the modulated IF signal with an LO signal from LO synthesizer 206 (404). Control circuit 204 may select the frequency output by LO synthesizer 206 based on the desired frequency for the transmitted RF carrier signal. The mixed signal may include both the desired signal image and undesired signal images, such as harmonics, LO signal leakage and other signal images.

Control circuit 204 may send selector signal 234 to selector switches 220 and 222 to select an appropriate BPF from filters in the filter bank (406). The selected BPF may be based on the IF signal and the selected LO signal to filter out the undesired signal images. The selected BPF may filter the input signal and output a filtered RF carrier signal that includes the desired signal image to be amplified and transmitted by antenna 226 (408).

In one or more examples, the functions described above may be implemented in hardware, software, firmware, or any combination thereof. For example, control circuit 104 of FIG. 1 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media, may comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein, such as controller circuitry as well as control circuit 104, may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. These and other examples are within the scope of the following claims.

The invention claimed is:

1. A radio frequency transmitter device, the device comprising:

a control unit;

a signal generation unit configured to generate an intermediate frequency (IF) signal based on a first signal from the control unit;

a local oscillator (LO) configured to generate a radio-frequency (RF) LO signal based on a second signal from the control unit;

a filter bank comprising a plurality of band-pass filters (BPF), wherein each BPF of the filter bank is configured to pass a fraction of a total bandwidth of the device;

a mixer configured to mix the IF signal with the LO signal to produce a RF carrier signal;

wherein the control unit is configured to select a BPF from the plurality of BPFs based on the generated IF signal and the generated LO signal, and wherein the BPF of the filter bank is configured to filter the RF carrier signal.

2. The device of claim 1, wherein the signal generation unit is a digital to analog converter (DAC).

3. The device of claim 2, wherein to generate the IF signal the DAC is configured to:

generate the IF signal at a desired frequency, based on the first signal; and modulate the IF signal to produce desired pulse characteristics of the IF signal, based on the first signal.

4. The device of claim 1, wherein:

the total bandwidth of the device spans 1025 MHz to 1150 MHz, and a frequency range of the filter bank spans 1025 MHz to 1150 MHz.

5. The device of claim 1, wherein the filtered carrier signal is configured to interrogate a distance measuring equipment (DME) station.

6. The device of claim 1, wherein:

the device is configured to mix the IF signal with the LO signal via a mixer;

the control unit selects the BPF of the filter bank via a selector switch electrically connected between the mixer and the filter bank.

7. The device of claim 1, wherein the filter bank comprises a plurality of surface acoustic wave (SAW) filters.

8. The device of claim 1, wherein an output of the filter bank is electrically connected to an amplifier.

9. A system comprising:

a control unit;

a local oscillator (LO) configured to generate a radio-frequency (RF) LO signal based on a control signal from the control unit;

a first channel, the first channel comprising:

a first signal generation unit configured to generate a first intermediate frequency (IF) signal based on a first signal from the control unit;

a first mixer configured to:

receive a first LO signal from the LO and the first IF signal from the first signal generation unit, and output a first carrier signal comprising the mixed first LO signal and first IF signal;

a first bandpass filter (BPF) configured to receive the first carrier signal, and output a filtered first carrier signal, wherein the filtered first carrier signal comprises a transponder reply signal;

a second channel, the second channel comprising:

a second signal generation unit configured to generate a second IF signal based on a second signal from the control unit;

a filter bank comprising a plurality of BPFs, wherein each BPF of the filter bank is configured to pass a fraction of a total bandwidth of the second channel;

a mixer configured to mix the second IF signal with the LO signal to produce a RF carrier signal;

wherein the control unit is configured to select a BPF from the plurality of BPFs based on the generated IF signal and the generated LO signal, and wherein the BPF of the filter bank is configured to filter the RF carrier signal.

10. The system of claim 9, wherein the first signal generation unit and the second signal generation unit are each a digital to analog converter (DAC).

11. The system of claim 9, wherein to generate the second IF signal the second signal generation unit is configured to:

generate the second IF signal at a desired frequency, based on the second signal; and modulate the IF signal to produce desired pulse characteristics of the IF signal, based on the second signal.

12. The system of claim 9 wherein the first carrier signal further comprises a traffic collision avoidance system (TCAS) interrogation signal.

13. The system of claim 9, wherein the filtered second carrier signal is configured to interrogate a distance measuring equipment (DME) station.

14. The system of claim 13, wherein the system determines the frequency of the filtered second carrier signal based on input from a system user.

15. A method comprising:

generating an intermediate frequency (IF) signal;

modulating the IF signal to produce desired pulse characteristics;

mixing the IF signal with a selected local oscillator (LO) signal to produce a carrier signal;

selecting a bandpass filter (BPF) from a filter bank comprising a plurality of BPFs based on the IF signal and the selected LO signal, wherein each BPF of the filter bank is configured to pass a fraction of a total bandwidth of a transmitter circuit; and filtering the carrier signal with the selected BPF to produce a filtered carrier signal.

16. The method of claim 15, wherein generating and modulating the IF signal comprises generating and modulating the IF signal with a digital to analog converter (DAC).

17. The method of claim 16, wherein a pass band of each BPF of the filter bank is based on a frequency range of the DAC.

18. The method of claim 15, wherein the filtered carrier signal is configured to interrogate a distance measuring equipment (DME) station.

19. The method of claim 15, wherein the filtered carrier signal is configured as a traffic collision avoidance system (TCAS) interrogation signal.

20. The method of claim 15, wherein the filtered carrier signal is configured as a transponder reply signal.

* * * * *